May 19, 1959  K. H. MINDRUM  2,887,236
MATERIAL HANDLING APPARATUS
Filed May 7, 1956  4 Sheets-Sheet 2

INVENTOR.
KENNETH H. MINDRUM
BY
ATTORNEYS

May 19, 1959
K. H. MINDRUM
2,887,236
MATERIAL HANDLING APPARATUS
Filed May 7, 1956
4 Sheets-Sheet 4
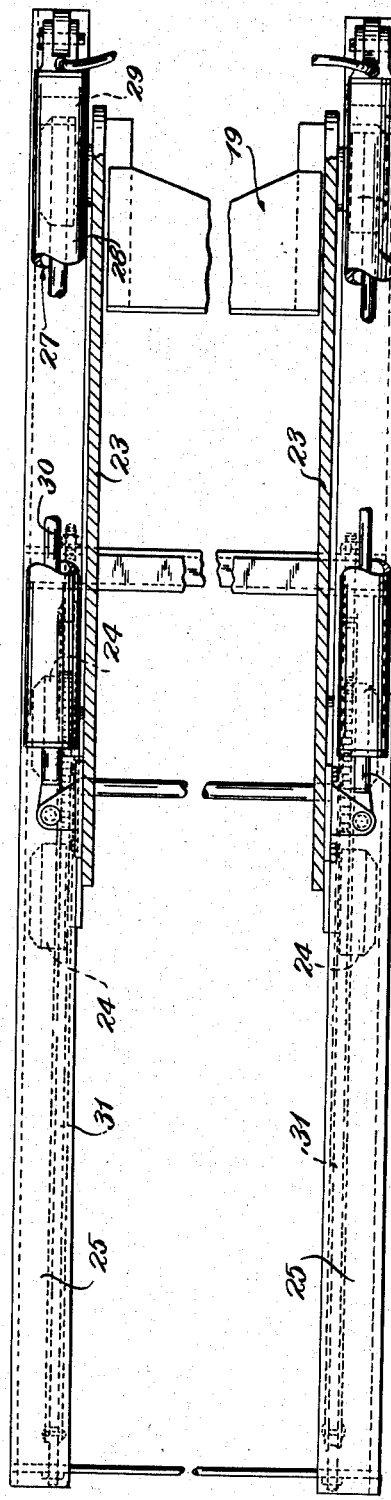
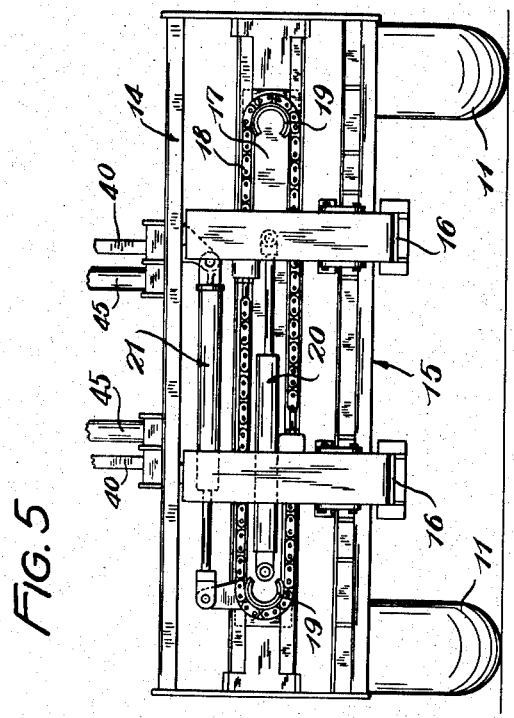
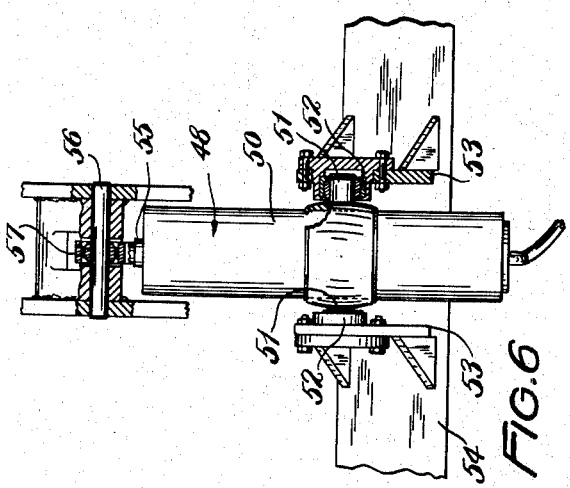
INVENTOR.
KENNETH H. MINDRUM
BY
ATTORNEYS

United States Patent Office 2,887,236
Patented May 19, 1959

2,887,236
MATERIAL HANDLING APPARATUS

Kenneth H. Mindrum, Battle Creek, Mich., assignor, by mesne assignments, to Otis Elevator Company, New York, N.Y., a corporation of New Jersey Application May 7, 1956, Serial No. 583,114

4 Claims. (Cl. 214—140)

The present invention relates to a material handling apparatus and, more particularly, to a material handling vehicle having an elevatable load carrier supported thereon.

The principal object of the present invention is the provision of a new and improved material handling vehicle which may be readily utilized to pick up a load at one point and deliver it to an elevated point even though access to the elevated point is through a relatively small opening, such as an airplane door, the vehicle having a carriage supported on the chassis thereof for linear movement in a generally horizontal plane and a load handling member pivotally mounted on the carriage for swinging movement in a generally vertical plane, the load handling member preferably being maintained in substantially a preselected angular position as it is swung vertically.

Another object of the present invention is the provision of a new and improved material handling vehicle having a boom supported thereon for horizontal movement in the direction of its length and for swinging movement in a vertical plane about a first horizontal axis to raise and lower the free end thereof, and a load carrier connected to the free end of the boom for tilting movement about a second horizontal axis, the load carrier having a side-shiftable load-engaging member supported thereon for movement transversely of the length of the boom.

Another object of the present invention is the provision of a new and improved material handling vehicle having a load carrier comprising a pair of load-engaging fork members or tines which are side-shiftable as a unit, the carrier being supported on the vehicle for linear movement in a generally horizontal plane with respect to the vehicle chassis and swinging movement in a vertical plane about a first generally horizontal axis to raise and lower the load carrier while the load carrier is maintained in substantially the same angular position, as well as for tilting movement about a second horizontal axis, whereby the vehicle is particularly adapted for use in handling a load to be deposited through an access opening to an elevated chamber, such as the interior of an airplane.

The invention resides in certain constructions, combinations and arrangements of parts, and further objects and advantages will be apparent to those skilled in the art to which it relates from the following description of the preferred embodiment described with reference to the accompanying drawings, forming a part of this specification, in which:

Fig. 4 is a fragmentary front elevational view of the truck;

Fig. 5 is an enlarged sectional view along line 5—5 of Fig. 2 with certain parts omitted for the sake of clarity;

Fig. 6 is a fragmentary view, with parts cut away, showing the fluid pressure actuator for raising and lowering the load carrier.

Figure 1:
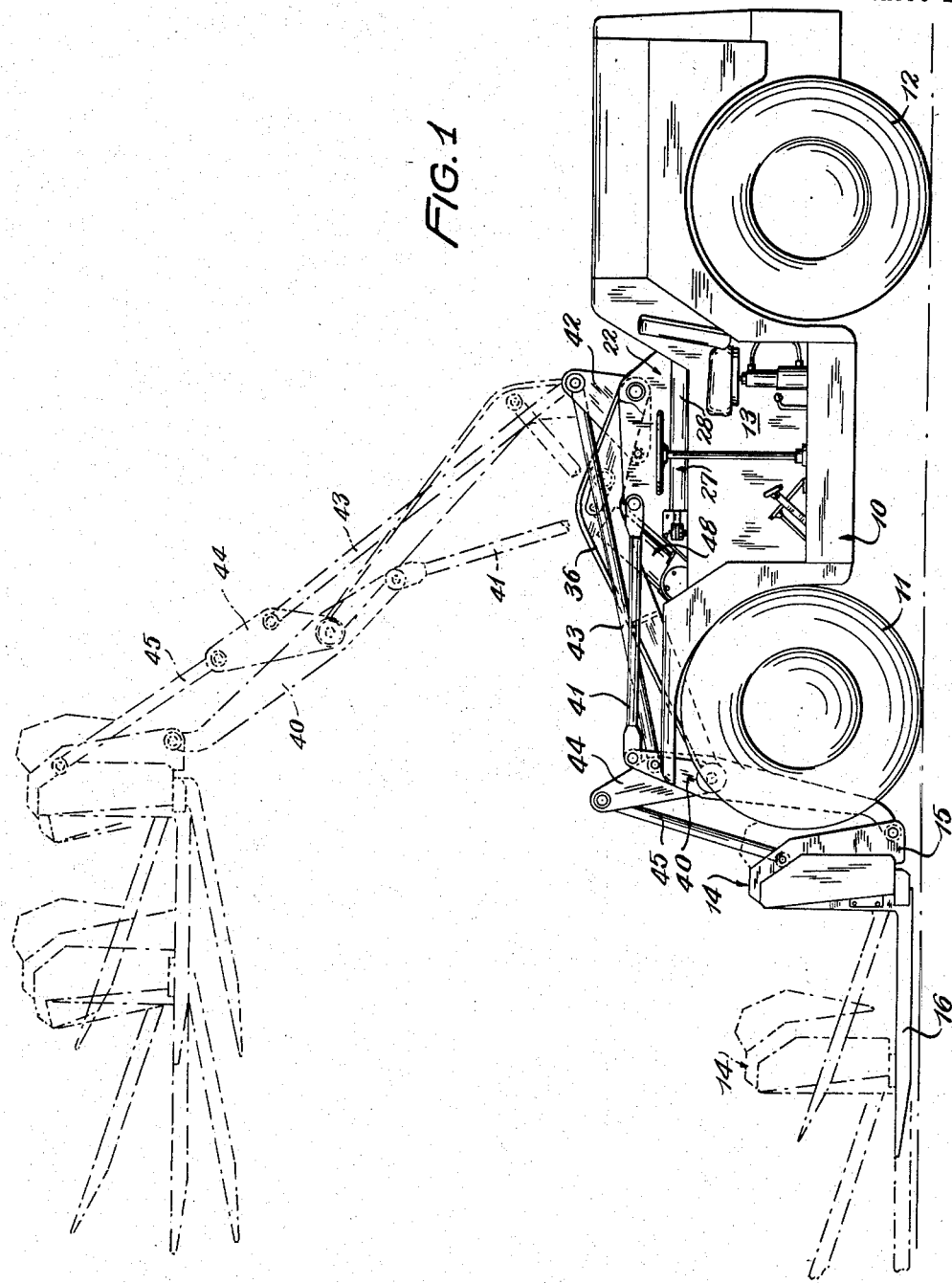
Fig. 1 is a side elevational view of an industrial truck embodying the present invention and illustrates various positions of the load handling member.

While the present invention is susceptible of various modifications and constructions and of uses with various types of material handling apparatuses, the preferred embodiment thereof is an automotive vehicle or truck. When embodied in an automotive truck, the present invention renders the truck particularly useful in loading aircraft or for delivering loads to various elevated points where access to the point is limited.

Referring to the drawings, the automotive truck shown therein comprises a chassis 10 having pairs of wheels 11, 12 at the opposite ends thereof, respectively, both of which are preferably steerably connected to the chassis and operable independently of each other, and an operator's position 13 located centrally of the length of the chassis 10. A load carrier 14 is supported at one end of the chassis 10, the front end in the illustrated embodiment, for elevational swinging movement about a horizontal axis and for horizontal movement along a line extending parallel to the length of the chassis 10 to move the load carrier 14 longitudinally of the truck.

The load carrier 14 comprises a frame 15 extending transversely of the chassis 10 of the truck and having a pair of load-engaging fork members or tines 16 supported thereon for lateral or side-shifting movement as a unit with respect thereto and for movement toward and away from each other. The load-engaging fork members are connected to a slide member 17 by a closed chain 18 movably supported on the slide member by spaced supports 19. The load-engaging fork members are connected to different runs of the closed chain and are movable toward each other by movement of the chain in one direction to squeeze a load positioned therebetween, and away from each other by movement of the chain in the opposite direction. A double-acting fluid pressure actuator 20, comprising piston and cylinder elements, is connected between the slide member 17 and one of the fork members 16 and, in turn, to the other fork member by the chain 18. When the fluid pressure actuator 20 is operated in one direction, the members move toward each other by reason of their interconnection by chain 18, and when the actuator is moved in the opposite direction, the elements move away from each other.

The slide member 17 is mounted on the load carrier frame 15 for horizontal movement with respect thereto. Since the fork members are connected to the slide member 17 for movement therewith by the chain 18, the fork members 16 may be moved laterally or side-shifted as a unit by moving the slide member 17 by means of a fluid pressure actuator 21 comprising cooperating cylinder and piston elements operatively connected between the load carrier frame 15 and the slide member 17 and operable to shift the slide member 17 in either direction.

The load carrier 14 is mounted on a carriage 22 which is movable longitudinally of the chassis 10. The carriage 22 comprises a frame which includes spaced, vertically extending plates 23 mounting front and rear rollers 24 which operate in spaced parallel channels or guide members 25 carried by the chassis 10 adjacent the front end thereof and which extend longitudinally of the chassis. The front rollers 24 comprise a pair of rollers operating in each guide member 25 and rotatably supported by a carrier plate 26 pivotally supported by the adjacent plate 23.

The carriage 22 is moved longitudinally of the chassis 10 upon the operation of a pair of double-acting fluid pressure actuators 27 connected between the carriage 22 and the chassis 10. A fluid pressure actuator 27 is positioned above each of the guide members 25 and the actuators 27, in the illustrated embodiment, each comprise a cylinder element 28 having one end connected to the chassis 10, and a piston element operable in the element 28 and connected to the adjacent vertical plate member 23 of the carriage 22 by a piston rod 30. The supply of pressure fluid to the actuators 27 is controlled by suitable levers located at the operator's position 13.

In order to assure that the carriage 22 will move along its guide members 25 without binding, a guide chain mechanism is provided. The guide chain mechanism includes a chain 31 under each guide member 25, which chains extends longitudinally along the guide members, and sprockets 32, 33 positioned on opposite sides of each of the chains 31. The chains 31 pass over the corresponding sprocket 32 and under the corresponding sprocket 33. The sprockets 32, 33 engaging each chain are supported in horizontal spaced relationship and are rotatably supported by the plates 23 of the carriage 22. The sprockets 32 are fixed to a common shaft which extends transversely of, and is rotatably supported by, the plates 23 of the carriage frame. Since the sprockets 32 must rotate as a unit, the carriage 22 is constrained to move along the chains 31 and the guide members 25 without binding.

Figure 2:
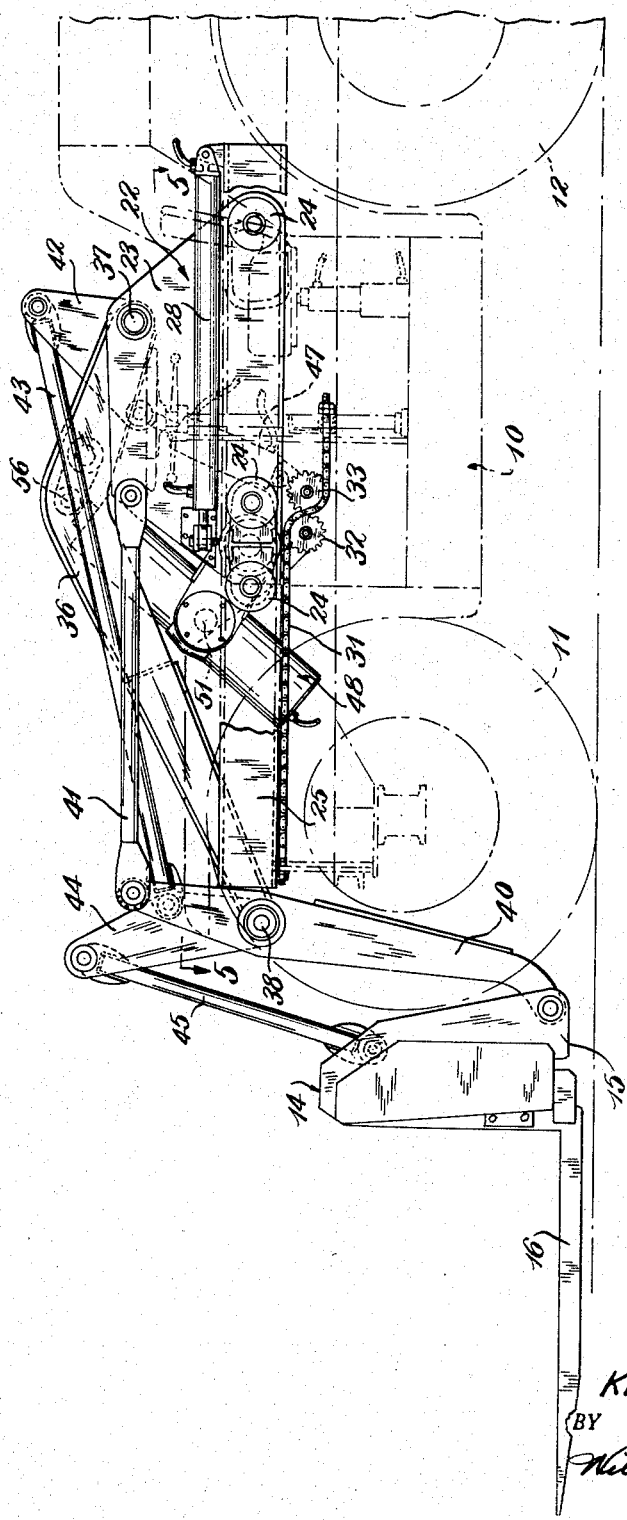
Fig. 2 is an enlarged side elevational view corresponding to Fig. 1 showing the load handling member and the operating and support linkage therefor in full lines with other parts of the truck being shown in dot-dash lines.
Figure 7:
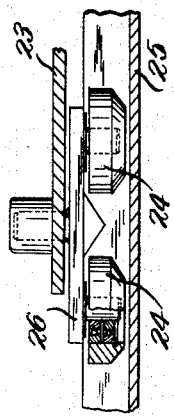
Fig. 7 is a detail fragmentary view showing the front rollers of the carriage.
Figure 3:
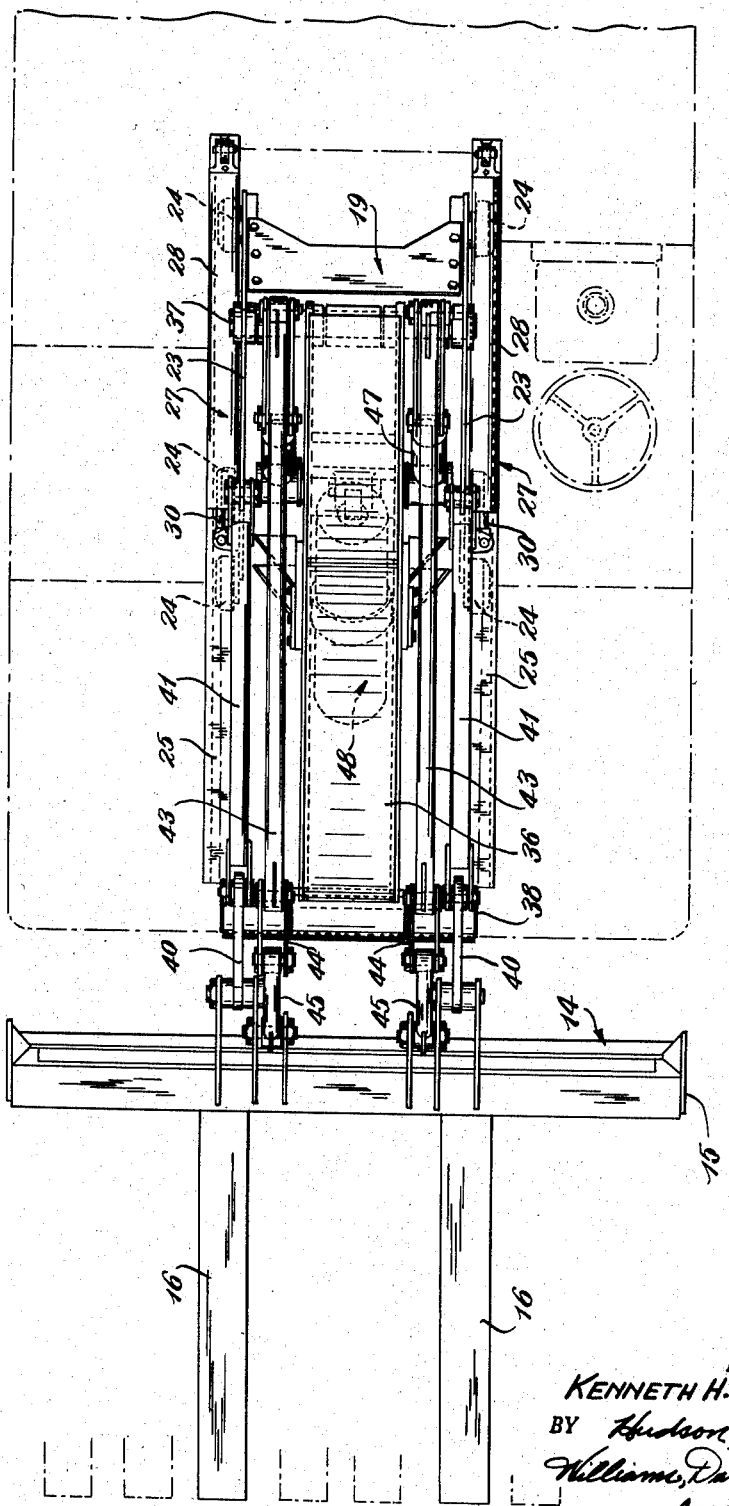
Fig. 3 is a plan view of the mechanism shown in Fig. 2.

The load carrier 14 is connected to the carriage 22 by mechanism which is operable to swing the load carrier in a vertical plane about a first horizontal axis and to tilt the load carrier about a second horizontal axis and which comprises, in the preferred embodiment, a boom 36. The boom 36 extends longitudinally of the chassis 10 and the inner end is pivoted to a shaft 37 which extends between the rearward ends of plates 23. The outer end of the boom 36 supports a transversely extending shaft 38, and a pair of substantially parallel arms 40 are rotatably connected to the shaft 38. The arms 40 extend rearwardly and forwardly of the shaft 38 with the major portions of the arms 40 extending forwardly from the shaft. The outer ends of the arms 40, which may be termed the lower end of the arms when the latter are positioned as indicated in full lines in Fig. 2 with the load carrier 14 adjacent to the ground, are pivotally connected to the lower back side of the transverse frame 15 of the load carrier. The inner ends, or the upper ends as viewed in Fig. 2, of the arms 40 are connected to a respective link 41 which, in turn, are pivotally connected to one of the plates 23 of the carriage 22. The links 41 are preferably substantially horizontal when the load carrier 14 is positioned adjacent the ground as shown in Figs. 1 and 2.

To provide parallel motion, or approximate parallel motion, of the load carrier 14 as the latter is swung vertically, a pair of inner rocker members 42 are rotatably supported on the shaft 37 and each of the rocker members 42 is connected by a respective link 43 to a corresponding outer rocker member 44 rotatably supported on the shaft 38. The outer rocker members 44 are, in turn, connected to the frame 15 of the load carrier 14 by a respective link 45 pivotally connected at opposite ends to the corresponding rocker member 44 and the frame 15. The boom 36 and the links 43 together with the rocker members 42, 44 constitute a parallelogram linkage or parallel-motion mechanism with the opposed members thereof being maintained in a predetermined relationship, while the arms 40 and the outer links 45 together with the frame 15 and the outer rocker members 44 constitute an outer parallelogram linkage or parallel-motion mechanism with the opposed parts thereof being maintained in a predetermined relationship. It will be seen, therefore, that the outer rocker members 44 are maintained in a fixed predetermined relationship with respect to the inner rocker members 42, and that the frame 15 of the load carrier 14 is always maintained in a predetermined relationship with the outer rocker members 44 and, in turn, the inner rocker members 42. If desired, the inner and outer linkages can be designed so that a tilting movement is also imparted to the load carrier as it is moved vertically. It may be desirable, in some cases, to tilt the load backward as it is raised to prevent the spilling thereof.

The inner rocker members 42 are normally held against rotation but are rotatable about the shaft 37 upon the operation of respective fluid pressure actuators 47 each comprising a cylinder element having one end connected to the frame of the carriage 22 and a piston element operable in the cylinder element and connected to the corresponding rocker member 42. The fluid pressure actuators 47 are double-acting actuators and operate to prevent rotation of the rocker members about the shaft 37 until the controls for supplying fluid pressure thereto are operated to cause movement of the piston elements of the actuators. It can be seen from the above description that when the inner rocker members 42 are rotated about the shaft 37 by the operation of the fluid pressure actuators 47, the rocker members 44 are maintained in parallel relationship thereto by the parallel-motion linkage comprising the boom 36 and the links 43 and that the frame 15 is pivoted around its connections to the arms 40 to maintain it in a predetermined position with respect to the outer rocker members 44 by the parallel-motion mechanism constituted by the arms 40 and the outer links 45. The various positions to which the load carrier 15 may be tilted upon operation of the fluid pressure actuators 47 are illustrated in Fig. 1.

The load carrier 15 is swung about the shaft 37 to elevate or lower the load carrier by the operation of a double-acting fluid pressure actuator 48. As is best shown in Fig. 6, the fluid pressure actuator 48 comprises a cylinder element 50 having diametrically opposed trunnions 51 which may rotate in bearings 52 supported by spaced support plates 53 welded, or otherwise secured, to a transverse frame member 54 extending between the plates 23. A piston element operates in the cylinder element 50 and is connected to the boom 36 by a piston rod 55, the piston rod 55 being connected to a pin 56 by a bearing 57 at the outer end of the piston rod. The pin 56 is carried by the boom 36.

When the fluid pressure actuator 48 is operated to raise the boom 36, the parallel-motion linkages operate to maintain load carrier 14 in the same angular position throughout its movement in the absence of the operation of the fluid pressure actuator 47. As the boom 36 is elevated, the links 41 will cause the arms 40 to swing about the shaft 38 to a position where, when the boom 36 is at its highest point, the arms 40 will substantially form a continuation of the boom. When the boom is lowered, the arms 40 will assume an angular position with respect to the boom which positions the load carrier 14 adjacent to the ground. Additionally, the load carrier 14 may be moved away from the front end of the vehicle, as shown in Fig. 1, by operation of the fluid pressure actuators 27 to move the carriage 22 longitudinally of the chassis 10.

An industrial truck constructed as above described is capable of handling heavy loads and is readily operable to pick up a load at a low elevation, such as one adjacent to the ground, and elevate the load to a higher position and move it through an access opening to deposit the load at an elevated point, and is particularly suitable for loading aircraft. The mounting of the load carrier 14 on a carriage which is movable longitudinally of the chassis 10 permits fine control of the movements of the load carrier 14 in a direction parallel to the length of the chassis 10 since it is not necessary to move the entire truck to provide endwise movement of the boom 36. The provision of means for tilting the load carrier, as well as means for side-shifting the load-engaging tines, facilitates the exact positioning of the load carrier with respect to the load or an access opening through which the tines or load thereon must pass.

From the foregoing description, it can be seen that the objects heretofore enumerated and others have been accomplished and that a new and improved material handling apparatus, particularly a material handling vehicle, has been provided in which the load carrier is supported by the free end of a boom which is, in turn, pivotally mounted on a carriage supported by the frame of the material handling apparatus for movement in a direction endwise of the boom, the load carrier preferably being connected to the boom and to the carriage by parallel-motion mechanism which maintains the load carrier in the same angular position with respect to the apparatus as the boom is raised and lowered, and which is operable to tilt the load carrier about a horizontal axis to change its angular position.

Having thus described my invention, I claim:

1. In a material handling vehicle, a chassis, means on said chassis forming a pair of generally horizontally spaced guideways, a carriage, means supporting said carriage in said guideways on said chassis for reciprocating movement longitudinally of the chassis, power actuated means operatively connected between said carriage and said chassis for selectively moving said carriage with respect to said chassis, a load carrier including a frame, a load-engaging member for handling the load, means movably supporting said load-engaging member on said frame for movement transversely of said chassis, power actuated means for side-shifting said load-engaging member, a boom extending longitudinally of said chassis, means pivotally connecting one end of said boom to said carriage for movement about a generally horizontal axis extending transversely of the length of said guideways, an arm pivotally connected to said frame and to the free end of said boom, a rocker member mounted on said carriage for pivotal movement about a generally horizontal axis extending transversely of the length of said guideways, link means pivotally connected to said load carrier and to said rocker member and forming with said boom and with said arm a mechanism for maintaining said load carrier and said rocker member in a predetermined angular relationship to each other, means for maintaining said rocker member in a fixed relationship with respect to said carriage and operable to move said rocker member about its said axis to change the relationship thereof to said carriage, and power actuated means for swinging said boom about its said axis to raise and lower said load carrier.

2. In a material handling vehicle, a chassis, a carriage, means supporting said carriage on said chassis for movement with respect to the chassis, power actuated means operatively connected to said carriage and to said chassis for selectively moving said carriage, a load carrier comprising a frame extending transversely of said chassis, a boom extending parallel to the direction of movement of said chassis, means pivotally connecting one end of said boom to said carriage for vertical swinging movement about a first horizontal axis, first rocker means supported on said carriage for pivotal movement about said axis, second rocker means supported by said boom adjacent to the free end thereof for pivotal movement about a second horizontal axis, means connecting said load carrier frame to the free end of said boom comprising an arm pivotally connected to said frame and to said boom for pivotal movement about said second axis, a link interconnecting said second rocker means and said frame and pivotally connected to said second rocker means and to said frame, pivoted link means interconnecting said second rocker means and said first rocker means, means connected to said first rocker means and selectively operable to rock the first rocker means about said first axis, power actuated means for raising and lowering said boom, and link means interconnecting said arm and said carriage for positioning said arm at an angle with respect to said boom when the latter is in its lowest position and for swinging said arm toward a position forming a continuation of said boom as the latter is elevated.

3. In a material handling vehicle, a chassis, a carriage, means supporting said carriage on said chassis for movement with respect to said chassis, power actuated means operatively connected between said carriage and said chassis for moving said carriage, a load carrier comprising a frame extending transversely of said chassis, a boom extending parallel to the line of movement of said carriage, means pivotally connecting one end of said boom to said carriage for vertical swinging movement about a first horizontal axis to raise and lower the free other end of the boom, first rocker means supported on said carriage for pivotal movement about said axis, second rocker means supported by said boom adjacent to the free end thereof for pivotal movement about a second horizontal axis, means connecting the load carrier frame to the free end of said boom comprising an arm pivotally connected to said frame and to said boom for pivotal movement about said second axis, a link interconnecting said second rocker means and said frame and pivotally connected to said second rocker means and said frame, link means extending generally parallel to said boom and interconnecting said second rocker means and said first rocker means, means connected to said first rocker means and selectively operable to rotate the first rocker means about said first axis, power actuated means for raising and lowering said boom, said arm having a portion on the side of said second axis remote from said load carrier, and link means pivotally connected to said portion and to said carriage for positioning said arm at an angle with respect to said boom when the latter is in its lowest position and for swinging said arm toward a position forming a continuation of said boom as the latter is elevated.

4. In a material handling vehicle, a chassis, a carriage, means supporting said carriage on said chassis for movement longitudinally of the chassis, power actuated means operatively connected between said carriage and said chassis for selectively moving said carriage, a load carrier comprising a frame, a boom extending longitudinally of said chassis, means pivotally connecting one end of said boom to said carriage for swinging movement about a first horizontal axis, first rocker means supported on said carriage for pivotal movement about said axis, second rocker means supported by said boom adjacent to the free end theeerof for pivotal movement about a second horizontal axis, outer parallel-motion means connecting the load carrier frame to the free end of said boom comprising an arm pivotally connected to said frame and to said boom for pivotal movement about said second axis and a link extending parallel to said arm interconnecting said second rocker means and said frame and pivotally connected to said second rocker means and said frame, means forming with said boom an inner parallel-motion linkage for maintaining said second rocker means and said first rocker means in a predetermined relationship to each other comprising link means extending parallel to said boom and interconnecting said second rocker means and said first rocker means, means for holding said first rocker means against rotation and selectively operable to rotate the first rocker means, power actuated means for raising and lowering said boom, and link means interconnecting said arm and said carriage for positioning said arm at an angle with respect to said boom when the latter is in its lowest position and for swinging said arm toward a position forming a continuation of said boom as the latter is elevated.

References Cited in the file of this patent

UNITED STATES PATENTS

| 2,347,456 | Beckwith | Apr. 25, 1944 |
| 2,603,374 | McNamara | July 15, 1952 |
| 2,663,443 | Schenkelberger | Dec. 22, 1953 |
| 2,668,631 | Reese | Feb. 9, 1954 |
| 2,753,060 | Lull | July 3, 1956 |

FOREIGN PATENTS

| 518,896 | Canada | Nov. 29, 1955 |